United States Patent
Nagata et al.

(10) Patent No.: US 7,760,448 B2
(45) Date of Patent: Jul. 20, 2010

(54) IMAGE STABILIZATION CONTROL CIRCUIT

(75) Inventors: Yasunori Nagata, Hashima (JP); Yasuhisa Yamada, Ame-gun (JP); Yuuki Tashita, Hashima (JP)

(73) Assignees: Sanyo Electric Co., Ltd., Moriguchi-Shi (JP); Sanyo Semiconductor Co., Ltd., Ora-Gun (JP)

( * ) Notice: Subject to any disclaimer, the term of this patent is extended or adjusted under 35 U.S.C. 154(b) by 30 days.

(21) Appl. No.: 12/314,306

(22) Filed: Dec. 8, 2008

(65) Prior Publication Data
US 2009/0161237 A1    Jun. 25, 2009

(30) Foreign Application Priority Data
Dec. 25, 2007    (JP)    ............... 2007-331833

(51) Int. Cl.
G02B 7/02       (2006.01)
G02B 3/00       (2006.01)
G03B 17/00      (2006.01)

(52) U.S. Cl. .................. 359/814; 359/723; 396/55; 348/208.6

(58) Field of Classification Search ............ 359/814, 359/811, 721–727; 348/208.99, 208.6, 252, 348/345, 352, 700; 396/54, 55
See application file for complete search history.

(56) References Cited

U.S. PATENT DOCUMENTS 7,424,213 B2 *    9/2008    Imada .................... 396/55
7,446,299 B2 *    11/2008    Kobayashi ............... 250/216
7,466,492 B2 *    12/2008    Tseng et al. .............. 359/665
2005/0201741 A1    9/2005    Moriya

FOREIGN PATENT DOCUMENTS

JP    2000-013671    1/2000
JP    2005-257919    9/2005

OTHER PUBLICATIONS

Feb. 19, 2010 Korean Office Action in Korean Application No. 10-2008-0107162.

* cited by examiner

Primary Examiner—Mohammad Hasan
(74) Attorney, Agent, or Firm—Oliff & Berridge, PLC

(57) ABSTRACT

A image stabilization control circuit for an image capturing device, wherein a gyro-equalizer (24) integrates an angular velocity signal from a gyro-sensor (12) in an integration circuit (46). The integration circuit (46) is composed of a low-boost filter (LBF), and a phase delay in a target compensation region is set to a value appropriate for an integration process. Furthermore, a characteristic whereby the LBF reduces the phase delay at higher frequencies is used, compensation is applied to the excess phase delay of the angular signal in the high-frequency region brought about by the effect of the phase delay generated in the high-frequency region by the output signal of the gyro-sensor (12), and the phase delay in the high-frequency region is brought nearer to 90 degrees. This allows the accuracy of the process for determining the required displacement magnitude of a lens to be increased.

6 Claims, 4 Drawing Sheets

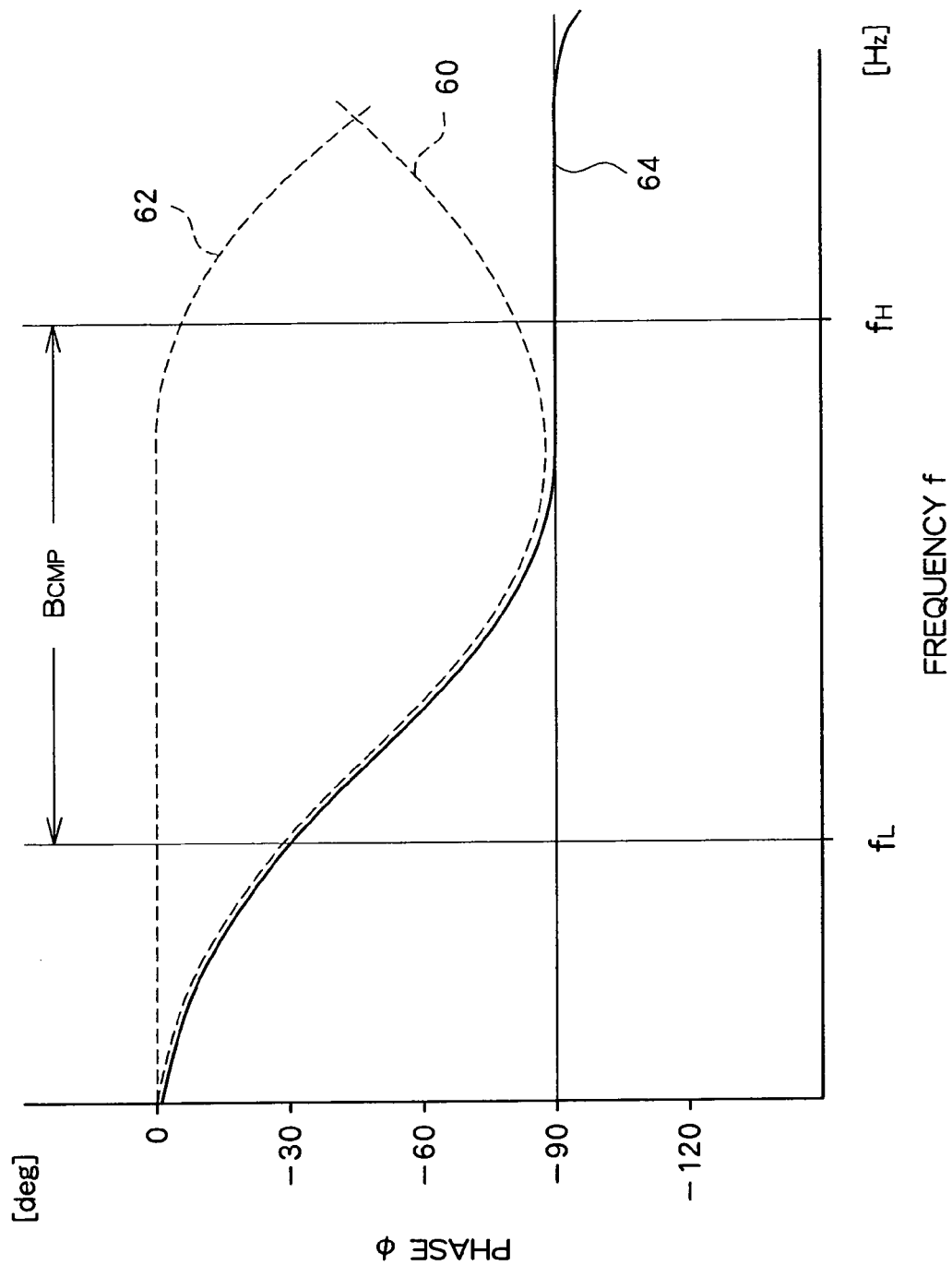

IMAGE STABILIZATION CONTROL CIRCUIT

CROSS-REFERENCE TO RELATED APPLICATION

The priority application number JP 2007-331833 upon which this patent application is based is hereby incorporated by reference.

BACKGROUND OF THE INVENTION

1. Field of the Invention

The present invention relates to a image stabilization control circuit for driving a vibration compensation mechanism provided in order to compensate for camera shake or other vibration in an image capturing device such as a digital still camera.

2. Description of the Prior Art(s)

Contemporary image capturing devices are often provided with camera shake correction functions in order to suppress a decline in picture quality due to camera shake. Many types of camera shake correction methods exist. In one of the methods, vibration in the image capturing device is detected by a vibration detector, and an optical component such as a correction lens, or an imaging element such as a CCD image sensor is displaced by an actuator on the basis of the detected signal. The vibration detector employs a gyro-sensor and detects angular velocity that corresponds to the change in the direction of the optical axis. The displacement magnitude of the lens or the like is used to controllably drive the actuator. Therefore, the image stabilization control circuit for generating the driving signal of the actuator performs a process in which the angular velocity or other type of displacement speed obtained from the vibration detector is integrated and converted to the displacement magnitude.

More particularly, the process for obtaining the displacement magnitude subjects the angular velocity signal outputted from the gyro-sensor to a camera shake component extraction process to remove a frequency component below the region of camera shake vibration frequencies, and converts the angular velocity into an angle-dependent displacement magnitude by integration. In the process for obtaining the displacement magnitude, by damping the output signal of the integration process or by other means, a centering process is also performed to establish the displacement magnitude so that it is made more difficult for the lens or the like to reach the movability limit. As used herein, the phrase "a processor for generating the vibration-compensating signal that corresponds to the displacement magnitude on the basis of the output signal of the gyro-sensor" is referred to as a gyro-equalizer.

Heretofore, gyro-equalizers have been implemented by software for which a microprocessor is used. In this case, a high processing rate is required for the image stabilization control circuit, and the microprocessor must be able to operate with a high speed clock. For instance, in the event that an imaging device is capturing 30 image frames per second to obtain moving images, it is necessary for the lens position to follow a vibration with a speed greater than $1/30^{th}$ of a second.

Power consumption increases in the image stabilization control circuit in the event that a microprocessor is driven using a high speed clock. An image capturing device carrying a image stabilization control circuit is driven by a secondary battery such as a lithium-ion battery as a power source. Therefore, as the power consumption of the image stabilization control circuit is increased, the secondary battery depletes more rapidly, and the drive time of the image capturing device is reduced. In other words, a problem arises in which the time for capturing moving pictures is reduced, and the number of capturing still images decreases. Because the camera shake correction function in an image capturing device often operates not only when capturing moving pictures or still images but also during preview mode when an image is being prepared, consumption of power by the camera shake correction function should preferably be reduced.

In this case, by implementing a gyro-equalizer with a filter circuit, the microprocessor can be dispensed with and power consumption can be reduced. More specifically, a camera shake component extraction process can be configured using a high frequency pass filter (high pass filter, or HPF). It is possible to perform an integration process by using a low frequency pass filter (low pass filter, or LPF). It is also possible to perform a centering process by using an HPF and removing the direct-current component of the integration process output signal.

In the event that these filter circuits are used to compose the gyro-equalizer, it is desirable that the phase of the output signal of the gyro-equalizer be 90 degrees delayed from the input signal of the gyro-equalizer. In other words, the accuracy of the integration signal decreases as the phase delay is shifted from 90 degrees, which in turn causes the accuracy of the displacement magnitude to decline and the vibration to be less accurately compensated.

The output of the gyro-sensor is therefore delayed in phase in the high-frequency region. The problem has been that this phase delay causes the integration process performed by the gyro-equalizer to become less accurate. FIG. 4 shows typical phase characteristics illustrating this problem. FIG. 4 shows a phase characteristic (phase curve 70) of the gyro-equalizer as such, a phase characteristic (phase curve 72) of the output signal of the gyro-sensor, and a phase characteristic (phase curve 74) of the output signal of the gyro-equalizer in which the phase characteristic of the output signal of the gyro-sensor is reflected. The horizontal axis corresponds to the frequency f, and the vertical axis corresponds to the phase φ of the output signal in relation to the input signal. In FIG. 4, frequency $f_L$ is the lower limit of the target compensation region $B_{CMP}$, and frequency $f_H$ is the upper limit. FIG. 4 shows that even if it is assumed that the phase characteristic (phase curve 70) of the gyro-equalizer as such is delayed by 90 degrees, the phase (phase curve 74) of the output signal thereof is affected by the phase delay (phase curve 72) of the output signal of the gyro-sensor, and is delayed even greater than 90 degrees.

In a vibration arising from camera shake or the like, the output signal of the gyro-equalizer may be comparatively weak in the high-frequency region, but the magnitude of the phase delay of the gyro-sensor increases as the frequency becomes higher. Therefore, there may be cases in which it is impossible to disregard the effect of the weak signal on the output of the gyro-equalizer. Particularly, this effect may be substantial in the case that the frequency region in which the gyro-sensor has a phase delay extends into the target compensation region $B_{CMP}$ in which the vibration component to be compensated is assumed to be present.

SUMMARY OF THE INVENTION

The present invention, which was perfected in order to resolve the aforementioned problems, provides a image stabilization control circuit capable of suppressing a decline in accuracy of a vibration-compensating signal generated based on an output signal of a gyro-sensor or other vibration detector, and compensating the vibration in an adequate manner.

The image stabilization control circuit according to the present invention is a circuit in which a vibration detection signal corresponding to the movement speed of an image capturing device is obtained from a vibration detector provided to the image capturing device, and which drives a vibration-compensation mechanism of the image capturing device, the control circuit having a vibration-compensating signal generator circuit for performing an integration process on the vibration detection signal and generating a vibration-compensating signal corresponding to the displacement magnitude of the image capturing device, and a servo-circuit for generating, on the basis of the vibration-compensating signal, a drive signal for driving the vibration-compensating mechanism. The vibration-compensating signal generator circuit has a high pass filter for damping a low-frequency component from the vibration-compensating signal and transmitting a vibration component of the target compensation region, and an integration circuit for performing the integration process on the vibration detection signal transmitted by the high pass filter. The integration circuit uses a phase delay compensation circuit for compensating a phase delay in the target compensation region, achieves a counterbalance between a reduced phase delay of the phase delay compensation circuit in a high-frequency region, and a phase delay of the vibration detection signal increased in the high-frequency region, by the characteristics of the vibration detector, and adjusts the phase characteristics in the target compensation region and the high-frequency region.

BRIEF DESCRIPTION OF THE DRAWINGS

FIG. 3 is a graph schematically showing the phase delay characteristics of a gyro-equalizer.

DESCRIPTION OF THE PREFERRED EMBODIMENTS

Several embodiments of the present invention will be described hereinafter with reference to the accompanying drawings. The present embodiments relate to a camera, and the image stabilization control circuit according to the present invention is used in the camera shake correction function of the camera.

Figure 1:
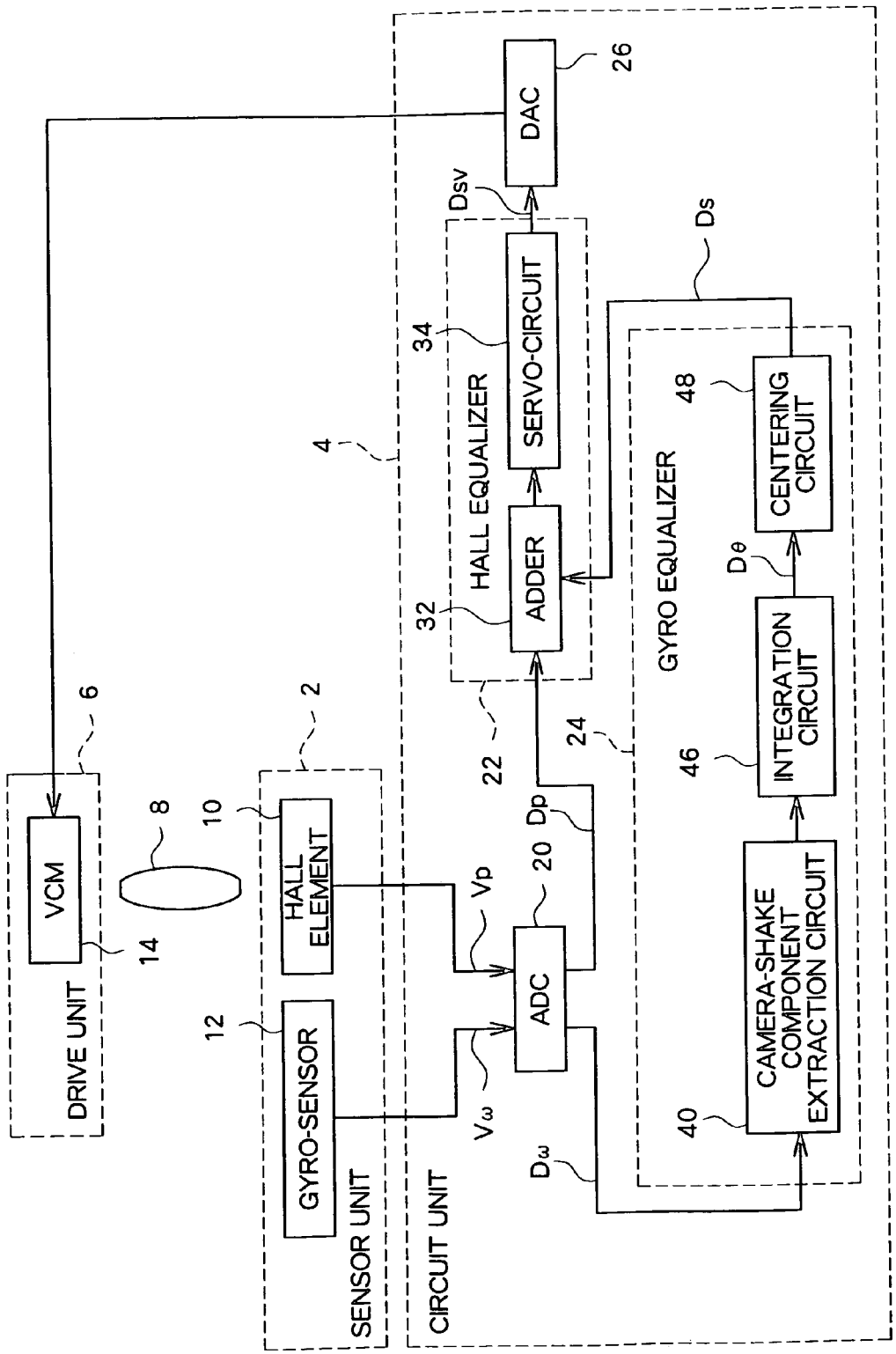
FIG. 1 is a schematic block diagram showing a camera shake correction system according to an embodiment of the present invention.

FIG. 1 is a schematic block diagram showing a camera shake correction system according to an embodiment. The camera shake correction system has a sensor unit 2, a circuit unit 4, and a drive unit 6. Several schemes can be used for the camera shake correction system. For example, the present system can operate according to a scheme for controlling the location of a corrective lens (lens 8) provided to an optical system for forming an optical image on a receiving surface of an image pickup element (not shown).

The sensor unit 2 is composed of a Hall element 10 and a gyro-sensor 12. The Hall element 10 is a sensor provided in order to detect a displacement of the lens 8, and the element generates a voltage signal $V_P$ corresponding to the distance to the lens 8 on the basis of the magnetic field of a magnet fixed to the lens 8, and outputs the signal to the circuit unit 4. In order to detect the two-dimensional position ($P_X$, $P_Y$) of the lens 8 within a plane (x-y plane) perpendicular to the optical axis, the Hall element 10 is provided in correspondence with both the x-direction and the y-direction, and the signal $V_P$ can be obtained in each of the x-direction and the y-direction.

The gyro-sensor 12 is a sensor (vibration detector) provided in order to detect vibration of a camera, and the sensor presents the circuit unit 4 with a voltage signal $V_\omega$ corresponding to an angular velocity ω as a vibration detection signal corresponding to the displacement velocity of the camera. Two gyro-sensors 12 are also provided, and these sensors can provide the signal $V_\omega$ both for the angular velocity component around the x-axis and for the angular velocity component around the y-axis.

The displaceable lens 8 and the drive unit 6 for displacing the lens 8 constitute a vibration-compensating mechanism, and the drive power source of the drive unit 6 is composed of, for example, a voice coil motor (VCM) 14. The VCM 14 linearly displaces the VCM-constituting movable coil and controls the position of the lens 8 in accordance with the voltage of the drive signal generated by the circuit unit 4. In order to implement two-dimensional displacement within the x-y plane, a pair of VCMs 14 is provided, allowing displacement to be made both in the x-direction and in the y-direction.

The circuit unit 4 has an A/D converter (ADC; Analog-to-Digital Converter) 20, a Hall equalizer 22, a gyro-equalizer 24, and a D/A converter (DAC; Digital-to-Analog Converter) 26. The circuit unit 4 is composed of logic circuits, and is formed as, for example, an ASIC (Application Specific Integrated Circuit).

The output signals of the Hall element 10 and gyro-sensor 12 are inputted to the ADC 20. The ADC 20 converts the voltage signals $V_P$ outputted by the two Hall elements 10 and the voltage signals $V_\omega$ outputted by the two gyro-sensors 12 into digital data on a time-sharing basis. Each of the signals is periodically converted from analog to digital for each servo control cycle.

Position data $D_P$ generated based on the output of the Hall elements 10 is inputted to the Hall equalizer 22. Angular velocity data $D_\omega$ generated based on the output of the gyro-sensor 12 is inputted to the gyro-equalizer 24.

The gyro-equalizer 24 is a circuit for generating a vibration-compensating signal corresponding to the camera displacement. The equalizer integrates the angular velocity $D_\omega$ inputted over a prescribed sampling period in each servo control cycle, and generates data $D_\theta$ corresponding to a vibration angle θ of the camera around the x-axis and y-axis. The gyro-equalizer 24 generates and outputs vibration-compensating data $D_S$ corresponding to the camera shake magnitude in both the x-direction and the y-direction on the basis of the data $D_\theta$. The composition of the gyro-equalizer 24 will be further described below.

The Hall equalizer 22 has an adder 32 and a servo circuit 34. The adder 32 adds positional data $D_P$ inputted from the ADC 20 and vibration-compensating data $D_S$ from the gyro-equalizer 24 separately in the x and y-directions. The servo circuit 34 calculates servo data $D_{SV}$ that corresponds to the required displacement magnitude of the lens 8 from the output data of the adder 32 both in the x-axis direction and in the y-axis direction.

The DAC 26 converts the servo data $D_{SV}$ outputted from the Hall equalizer 22 into an analog voltage signal. The voltage signal outputted by the DAC 26 is subjected to a predetermined amplification process and is applied to the VCM 14. The VCM 14 is driven in the direction in which the absolute value of $D_{SV}$ decreases, the lens 8 in a camera provided with the present system is thereby moved in accordance with the camera shake in the image capture interval, the shake-induced displacement of the subject image on the image element can be compensated, and a high-quality image signal can be obtained.

Next, the composition of the gyro-equalizer 24 will be described. The gyro-equalizer 24 has a camera shake component extraction circuit 40, an integration circuit 46, and a centering circuit 48.

The camera shake component extraction circuit 40 is an HPF, and the circuit is presented with an angular velocity signal composed of temporally sequenced angular velocity data $D_\omega$ from the ADC 20, damps the direct-current component contained in the angular velocity signal, and extracts the high-frequency component of the angular velocity signal reflected by the vibration of the camera. The camera shake component extraction circuit 40 is composed of a digital filter.

The integration circuit 46 integrates the angular velocity signal outputted by the camera shake component extraction circuit 40, and generates an angular signal for indicating the displacement magnitude of the image capturing device. The integration circuit 46 is configured using a phase delay compensation circuit. This configuration will be described below.

The angular signal obtained from the integration circuit 46 is inputted into the centering circuit 48. The centering circuit 48 performs a process for correcting the displacement magnitude so that it becomes difficult for the lens 8 to attain the movability limit of the vibration-control mechanism. One centering process technique is a method for damping a component that is considered to be a direct current component and has a frequency lower than the lower limit $f_L$ of the target compensation region $B_{CMP}$ from the angular signal obtained by integration. In this case, the centering circuit 48 can be configured using an HPF. The HPF is composed of a digital filter, and the filter characteristics are set depending on a filter factor set by a register (not shown). In basic terms, the cutoff frequency $f_C$ of the HPF constituting the centering circuit 48 is set below the lower limit $f_L$ of the target compensation region $B_{CMP}$. In addition, the phase characteristic is preferably set so that the phase lead of the HPF generated in the low-frequency region does not reach into the region $B_{CMP}$.

In the present invention, the integration circuit 46 is composed of a phase delay compensation circuit, as described above, in response to the aforementioned problem in which the phase of the output signal of the gyro-sensor 12 is delayed in the high-frequency region, and the delay increases as the frequency increases. The phase delay compensation circuit can be composed of a digital filter, and the filter characteristics are set by a filter factor set by a register (not shown). In basic terms, the phase characteristic of the phase delay circuit constituting the integration circuit 46 is preferably set so that the 90-degree phase delay obtained in the integration process is implemented in the shake-correcting target compensation region $B_{CMP}$.

Figure 2A:
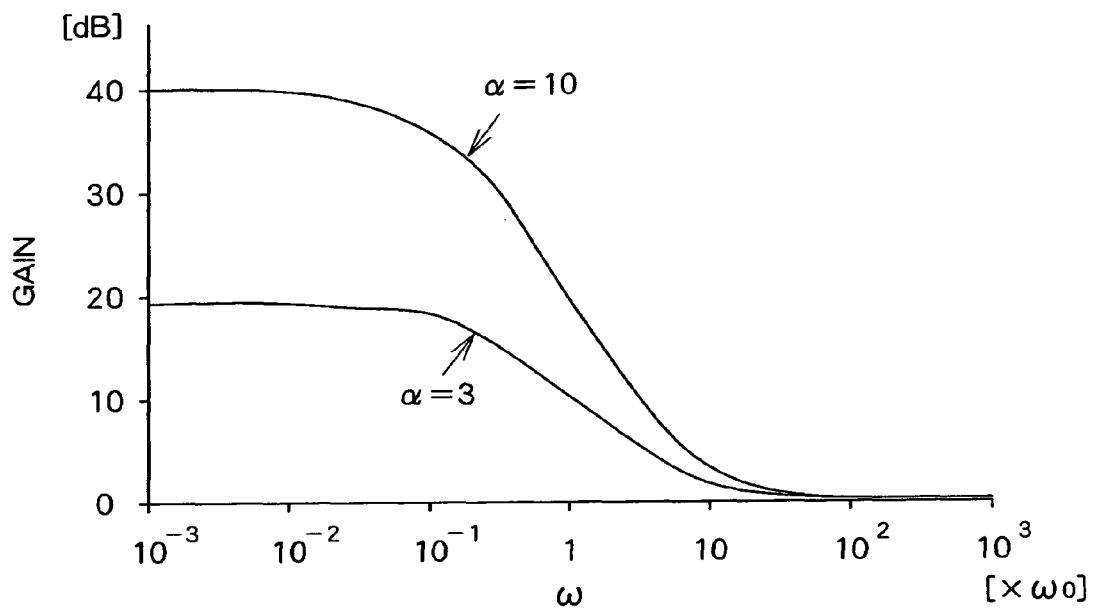
FIGS. 2A and 2B are schematic Bode diagrams of general phase delay elements.
Figure 2B:
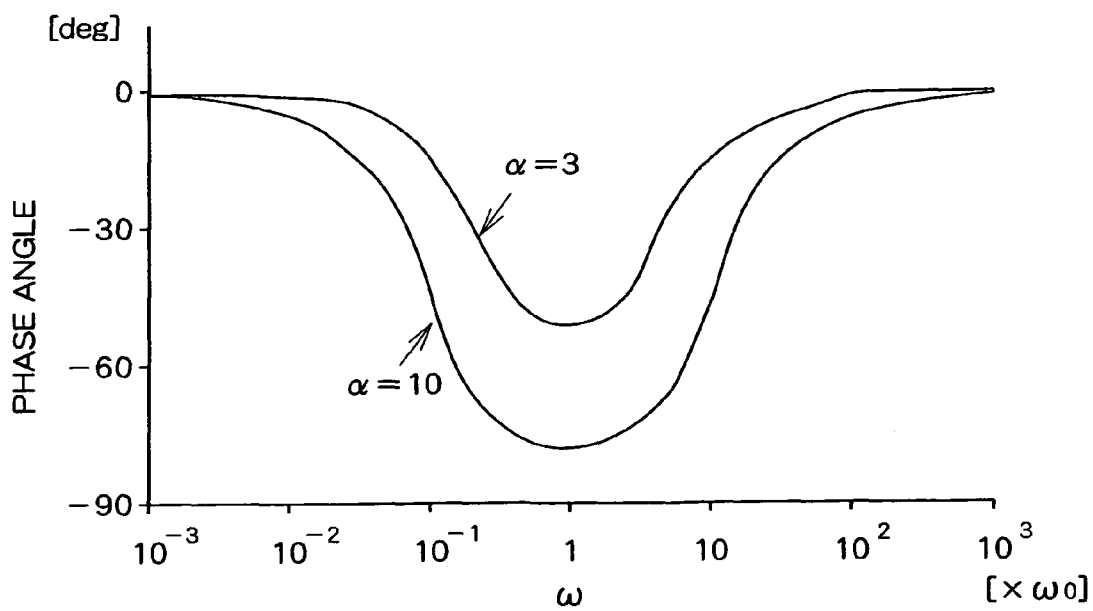

FIGS. 2A and 2B are schematic Bode diagrams of a general phase delay compensation element. FIG. 2A shows a gain characteristic, and FIG. 2B shows a phase characteristic. Such phase lead compensation elements may, for example, be provided with a transfer function G(s) having the bilinear form shown below.

$$G(s)=K(s+\alpha\omega_0)/\{s+(1/\alpha)\omega_0\}$$

Here, s is a Laplace operator. Also, K, $\alpha$, and $\omega$ are parameters, where $\omega_0>0$ and $\alpha>1$. In the simple case that K=1, the gain characteristic of a phase delay compensation element provided with this transfer function is equal to $\alpha(20 \log_{10} \alpha$ [dB]) when the angular frequency of the input signal is $\omega_S=\omega_0$, is asymptotic to $\alpha^2(40 \log_{10} \alpha$ [dB]) in the low-frequency region, and is asymptotic to 1 (0 [dB]) in the high-frequency region. The phase is defined as the maximum phase delay angle $\phi_M$ when $\omega_S=\omega_0$, and is asymptotic to 0 as $\omega_S$ moves away from $\omega_0$ toward lower frequencies or higher frequencies. $\phi_M$ is given by the following formula and has an absolute value of 90 degrees or less. An increase in $\alpha$ is accompanied by an increase in the absolute value of $\phi_M$ and causes the effect of the phase delay compensation to reach a wider frequency region.

$$\phi_M=\tan^{-1}\{(1/\alpha-\alpha)/2\}$$

A filter having the phase delay compensation characteristic shown in FIG. 2A or 2B is referred to as a low-boost filter (LBF) The configuration of the gain characteristic is obtained by applying a shelf-form gain to the low region, and the filter is therefore also referred to as a low-shelf filter (low-shelving filter).

Figure 4:
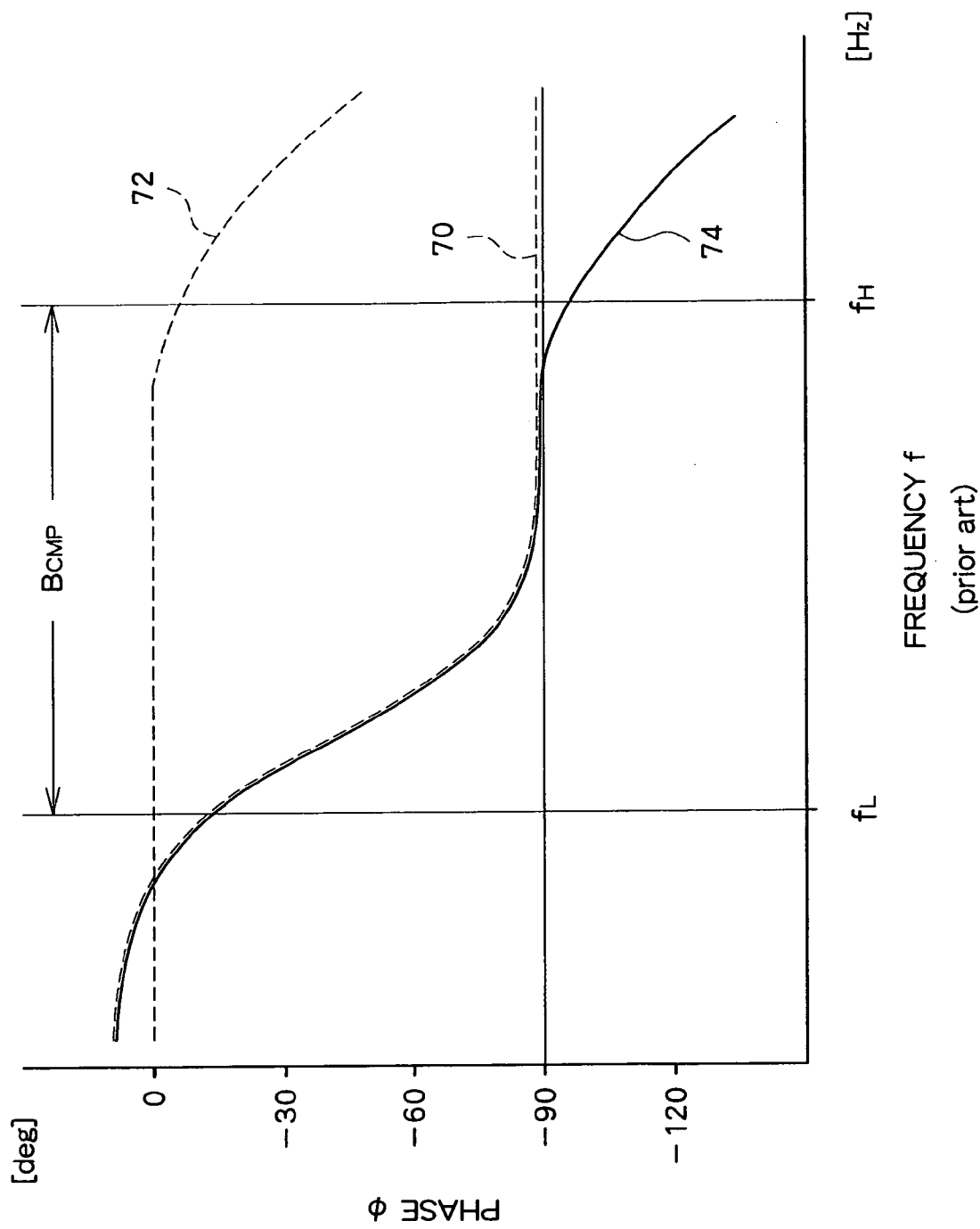
FIG. 4 is a view showing schematic phase characteristics to illustrate the problems arising in the output signal of a conventional gyro-equalizer.

The integration circuit 46 is configured using an LBF, and the phase delay compensation range and degree are set so that the phase delay is compensated in the target compensation region $B_{CMP}$ and that a counterbalance is achieved between a reduction in the phase delay in a frequency region higher than $\omega_0$ and the phase delay of the output signal of the gyro-equalizer 12 in a high-frequency region such as the one shown by the phase curve 72 in FIG. 4 by adjustment of $\omega_0$ and $\alpha$. The integration circuit 46 matches the phase characteristic of the compensation control signal outputted by the gyro-equalizer 24 with a 90-degree phase delay relative to the inputted angular velocity signal by compensating the phase delay in the target compensation region $B_{CMP}$. In addition, counterbalancing the characteristic of the gyro-sensor in the high-frequency region allows the phase characteristic of the compensation control signal corresponding to the 90-degree phase delay to expand as much as possible into the high-frequency region from the target compensation region $B_{CMP}$, and the accuracy of the compensation control signal outputted by the gyro-equalizer 24 to be improved.

FIG. 3 is a graph schematically showing the phase characteristics of the gyro-equalizer 24. FIG. 3 shows the phase characteristic (phase curve 60) of the integrator circuit 46, the phase characteristic (phase curve 62) of the output of the gyro-sensor 12, and the phase characteristic (phase curve 64) of the gyro-equalizer 24.

As shown in this drawing, it is possible to compensate for the excess phase delay caused by the phase delay of the gyro-sensor 12 at higher frequencies by composing the LBF from the integrator circuit 46, and to implement a 90-degree phase delay in the target compensation region $B_{CMP}$ and the adjacent high-frequency region.

By thus bringing the phase characteristic nearer to a 90-degree delay in a wide region that includes the target compensation region $B_{CMP}$, a compensation control signal corresponding to the angle $\theta$ obtained by appropriately integrating the angular velocity $\omega$ can be obtained from the gyro-equalizer 24.

There may be cases in which a single LBF is insufficient to adequately compensate an excess phase delay caused by the gyro-sensor 12 and to bring the phase delay in the low-frequency part of the target compensation region $B_{CMP}$ nearer to 90 degrees. More specifically, a phase delay deficiency can arise at the lower frequencies in the target compensation region $B_{CMP}$ in the case of using an LBF suitable for compensating the excess phase delay caused by the gyro-sensor 12, as shown in FIG. 3. In this case, phase delay compensation can be selectively added to the frequency range of the phase delay deficiency by providing another LBF, and the phase characteristic in the low-frequency part of the target compensation region $B_{CMP}$ can be brought nearer to 90 degrees.

As can be understood from Bode's theorem, an element for selectively generating a phase delay in a frequency range essentially serves as a low-shelf filter for generating a gain transition in the frequency range. The low-shelf filter, in addition to having the above-mentioned bi-linear function, may also have a bi-quadratic transfer function. The integration circuit 46 can be composed of a digital filter in the form of a phase delay compensation element having a transfer function other than the above-mentioned bi-linear transfer function.

An arrangement is adopted in the gyro-equalizer 24 so that a process for generating a compensation control signal from an angular velocity signal is performed by a digital filter. The microprocessor or the like used in order to generate the compensation control signal can thereby be made unnecessary, and power consumption in the circuit unit 4 can be reduced. Furthermore, an arrangement in which the processing of the gyro-equalizer 24 is performed by a digital filter makes it possible to reduce the circuit surface area as compared with an arrangement having a microprocessor or the like. It is possible to thereby reduce the cost of the semiconductor chip on which the circuit unit 4 is formed. Furthermore, the filter factor or other adjustment data can easily be changed by composing the gyro-equalizer 24 from the digital filter. The setting of the adjustment data corresponding to the design of the image capturing device can thereby be changed with ease.

The embodiment of the present invention is based on a composition in which the position detection of the lens 8 and the drive of the lens 8 are performed by a Hall element 10 and a VCM 14, respectively, but the present application is not limited to this option alone. For example, the element for driving the lens 8 can be obtained using a stepping motor or a piezoelement. In addition, if a vibration detector generates a phase delay in the high-frequency region in the same manner as does the gyro-sensor, then the present invention can also be applied to the vibration control circuit of an image capturing device in which the detector is used.

In addition, the embodiment of the present invention is based on a lens shift scheme for driving a lens and correcting the camera shake, but the present application is not limited to this option alone. For example, the present invention can also be applied to an image sensor shift scheme for shifting a CCD image sensor or other image capturing element in accordance with the wobble of the image capturing device. In this case, the position of the image capturing element is detected by the sensor, and the image capturing element is displaced by an actuator.

According to the present invention as described above, the integration circuit is configured using a phase delay compensation circuit in place of an LPF. The phase delay compensation circuit has a gain characteristic for enhancing the low-frequency component relative to the high-frequency component, and has a phase characteristic such that the maximum phase delay of 90 degrees is generated and the phase delay moves asymptotically toward 0 in the direction from the frequency at which the phase delay is at the maximum toward lower frequencies or higher frequencies. The frequency region in which the phase delay of the phase delay compensation circuit is generated is set to the target compensation region, whereby an integration process for converting the angular velocity detected by the vibration detector into the displacement magnitude can be performed in the target compensation region. By achieving a counterbalance between a reduced phase delay in the high-frequency region of the phase delay compensation circuit and a phase delay in the high-frequency region of the vibration detector, the phase delay at the output of the gyro-equalizer can be made to correspond to the integration process in the case of a signal component of the high-frequency region as well. The angular velocity detected by the vibration detector can thereby be accurately converted into the displacement magnitude, and the accuracy of the vibration-compensating signal corresponding to the displacement magnitude of the image capturing device can be increased. As a result, the vibration of the image capturing device can be adequately compensated.

What is claimed is:
1. A image stabilization control circuit in which a vibration detection signal corresponding to the movement speed of an image capturing device is obtained from a vibration detector provided to the image capturing device, and which drives a vibration compensation mechanism of the image capturing device, the image stabilization control circuit comprising:
   a vibration-compensating signal generator circuit for performing an integration process on the vibration detection signal and generating a vibration-compensating signal corresponding to the displacement magnitude of the image capturing device; and
   a servo-circuit for generating, on the basis of the vibration-compensating signal, a drive signal for driving the vibration-compensating mechanism;
   wherein the vibration-compensating signal generator circuit has:
   a high pass filter for damping a low-frequency component from the vibration detection signal, and transmitting a vibration component of the target compensation region; and
   an integration circuit for performing the integration process on the vibration detection signal transmitted by the high pass filter; and
   wherein the integration circuit uses a phase delay compensation circuit for compensating a phase delay in the target compensation region, achieves a counterbalance between a reduced phase delay of the phase delay compensation circuit in a high-frequency region, and a phase delay of the vibration detection signal increased in the high-frequency region by the characteristics of the vibration detector, and adjusts the phase characteristics in the target compensation region and the high-frequency region.

2. The image stabilization control circuit of claim 1, wherein:
   the phase delay compensation circuit constituting the integration circuit is a low-boost filter.

3. The image stabilization control circuit of claim 1, wherein:
   the servo-circuit generates the drive signal on the basis of a signal that is a sum of a signal corresponding to a drive magnitude of the vibration compensation mechanism obtained from a drive magnitude detector provided to the image capturing device, and the vibration-compensating signal outputted from the vibration-compensating signal generator circuit.

4. The image stabilization control circuit of claim 1, wherein:
   the vibration-compensating signal generator circuit has a centering high-pass filter for damping a direct-current component from the output signal of the integration circuit.

5. The image stabilization control circuit of claim 1, wherein:
   the high-pass filter and the integration circuit include a digital filter circuit and a register; and
   the digital filter circuit performs a filtering process on the basis of a filter factor stored in the register.

6. The image stabilization control circuit of claim 4, wherein:
   the high-pass filter, the integration circuit, and the centering high-pass filter include a digital filter circuit and a register; and
   the digital filter circuit performs a filtering process on the basis of a filter factor stored is the register.

* * * * *